UNITED STATES PATENT OFFICE.

JOHANN FRIEDRICH MEYER, JR., LUDWIG ROSELIUS, AND KARL HEINRICH WIMMER, OF BREMEN, GERMANY, ASSIGNORS TO THE KAFFEE-HANDELS-AKTIENGESELLSCHAFT, OF BREMEN, GERMANY, A JOINT-STOCK COMPANY OF GERMANY.

PREPARATION OR TREATMENT OF COFFEE.

13,261. Specification of Reissued Letters Patent. Reissued June 27, 1911.

No Drawing. Original No. 897,840, dated September 1, 1908, Serial No. 315,180. Application for reissue filed July 5, 1910. Serial No. 570,504.

DIVISION A.

*To all whom it may concern:*

Be it known that we, JOHANN FRIEDRICH MEYER, JR., LUDWIG ROSELIUS, and KARL HEINRICH WIMMER, subjects of the German Emperor, residing at Bremen, Germany, have invented certain new and useful Improvements Relating to the Preparation or Treatment of Coffee, of which the following is a specification.

The present invention has for its object, to deprive coffee beans of caffein, without destroying their other valuable properties. Numerous attempts made for this purpose have been unsuccessful, and especially the treatment of the beans with volatile solvents for caffein has produced unsatisfactory results. The reason for failure seems to have been in the cellular tissue or organic structure of the coffee beans, which renders a sufficient penetration of the solvent almost impossible. Moreover, the caffein is contained in the beans in the shape of salts, which are hardly soluble at all in the volatile solvents. Finally there is the defect, that after prolonged treatment of the beans with the solvent it is exceedingly difficult to remove the solvent completely from the cells, even if the solvent had penetrated only into the outer cellular layers of the beans.

According to the present invention the coffee beans are first subjected to a preliminary treatment which causes the beans to swell and loosens the structure or cellular tissue of the same, preferably by exposing them to dry steam of about 1½–2 atmospheres in a closed receptacle. Subsequently gases or vapors having an acid or alkaline reaction are introduced into the apparatus, in order to decompose the salts of caffein. Ammonia, sulfurous acid, hydro-chloric acid and similar chemicals have been found specially suitable for this purpose. The caffein liberated by this treatment can be extracted more easily than its salts, and in case minute quantities of caffein have remained in the beans after the extraction, they are volatilized by the subsequent roasting, because at the temperature of roasting coffee caffein in its free state is capable of sublimation, although this is not the case with its salts.

The beans treated as described are extracted with a solvent of caffein, preferably one which dissolves only the latter, but as little as possible of the other constituents of the beans. We have found that benzene (also called benzol) is eminently suitable for this purpose, because an extract made with it leaves on evaporation almost pure caffein. In using other solvents, such as alcohol or chloroform, it would be necessary, to restore to the coffee-beans the extract, which has been relieved of caffein. Instead of a single solvent, such as benzene, mixtures of volatile solvents, may, of course, be employed for extracting the coffee beans.

The extraction of caffein is very energetic and leaves only minute traces undissolved, while the solvent action of the mixture for other constituents of coffee is comparatively weak. The boiling point of the mixture is lower than that of the individual components, and the extraction therefore takes place at a lower temperature.

It is useful to subject the coffee, after extraction, to the influence of dry steam at a pressure of about 1½ atmospheres, while keeping the beans continually in motion by stirring, or by causing the apparatus to revolve. An agitation of the beans is useful also during the extraction. In case traces of the extracting liquid remain in the beans in spite of this treatment with steam, these traces may be removed by subjecting the beans alternately to steam of different pressures, or alternately to pressure and vacuum. This treatment also serves to expel the traces of furfurol contained in the coffee, and to relieve the coffee of this constituent, which recent investigations have shown to be injurious.

Example: 100 kilograms of coffee beans are placed in a cylinder with a double jacket, the cylinder is heated indirectly by steam, in order to avoid as much as possible the condensation of the dry steam to be introduced. Subsequently, after the cylinder has been hermetically closed, steam is introduced until the pressure has risen to about 1½–2 atmospheres. This pressure is allowed to act for about half an hour, after which gaseous ammonia is admitted. When the space is filled with this gas, benzene (or a mixture of benzene and alcohol) is admitted and heated, the immediate effect of this being, that the escaping benzene vapors will carry with them any moisture that may be present and also the excess of ammonia. The heating is then continued for about 2 to 3 hours, and the benzene vapors thereby produced are condensed in the known manner and re-conducted into the apparatus. If necessary, the preliminary treatment (mentioned at the beginning of this specification) is repeated.

When the extraction is completed, the last remnant of the solvent mixture is removed from the beans, by admitting to the extractor dry steam, until a pressure of about 1½ atmospheres has been established, which is maintained for about 1 hour while conducting steam through the contents and keeping the apparatus in a rotary motion.

What we claim is:—

1. As a new article of manufacture unbroken green coffee beans originally containing caffein but freed therefrom and having their remaining natural constituents substantially unimpaired.

2. As a new article of manufacture, unbroken coffee beans originally containing caffein but freed therefrom.

3. As a new article of manufacture, unbroken coffee beans originally containing caffein but substantially freed therefrom.

4. As a new article of manufacture, unbroken green coffee beans originally containing caffein but substantially freed therefrom and having their remaining natural constituents substantially unimpaired.

In testimony whereof, we affix our signatures in the presence of two witnesses.

JOHANN FRIEDRICH MEYER, JR.
LUDWIG ROSELIUS.
KARL HEINRICH WIMMER.

Witnesses:
FREDERICK HOYERMANN,
FRIEDRICH SCHMIDT.